United States Patent Office 3,216,210
Patented Nov. 9, 1965

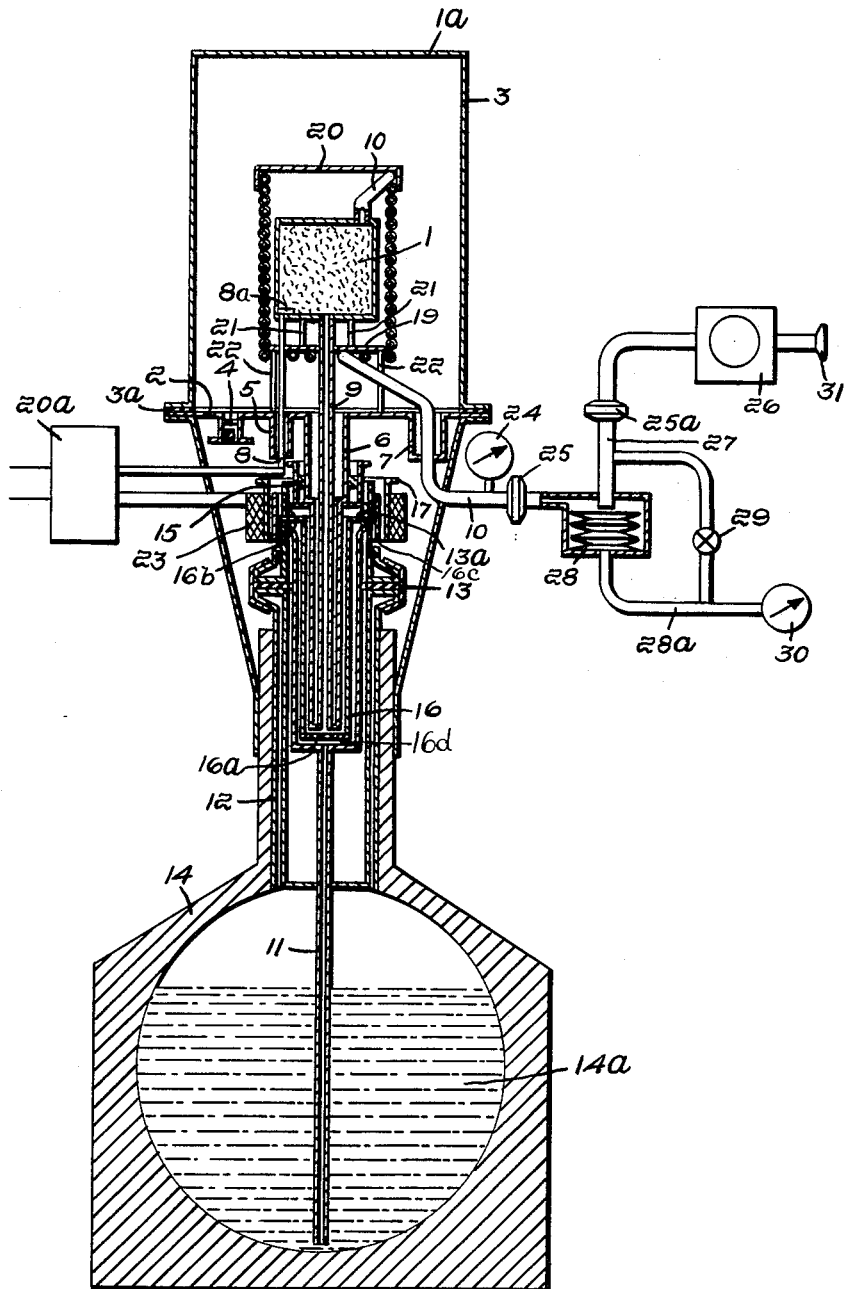

3,216,210
CRYOSTAT APPARATUS
Gustav Klipping, Limastrasse 38, Berlin, Germany
Filed Feb. 7, 1963, Ser. No. 257,015
Claims priority, application Germany, Feb. 10, 1962,
M 51,766
13 Claims. (Cl. 62—52)

Cryogenic technology provides temperatures below the boiling point of liquid gases (such as, for example, liquid helium, hydrogen, nitrogen, etc.) by allowing the liquid gas bath to boil under reduced pressure within a closed heat insulated vessel connected to an evacuation device. The temperature of the liquid gas bath is thus established by the vapor pressure prevailing above the liquid.

These cryostat devices as thus far known are particularly suited to cool test samples to a desired low temperature and maintain that temperature constant. For this purpose, the samples are introduced directly into the liquid bath or are held by a cooling finger in heat contact with the wall of the liquid bath container. Similar construction principles have been also utilized to provide deep cooling traps which are suitable for gas adsorption in vacuum containers.

Such designs of cryostat devices have been very standard as far as shape and installation of the condensation surfaces are concerned because of the complexities involved in handling low pressure liquid gas baths. These designs prove very inefficient and generally inadequate when the container surface is being used as a condensation surface for vacuum pumping operations because of the inherent difficulty involved in operating with low pressure liquid gas baths. For example, only the container wall surface in direct contact with the liquid bath is sufficiently cooled to provide practical condensation and the area of this surface is continuously depleted as a result of the falling liquid level caused by the liquid gas evaporation. To eliminate this problem by continuously replenishing the supply of liquid gas is exceedingly difficult because of the required low pressure operation and the extreme cold involved. Thus, most prior reduced pressure cryostat vacuum pumps have provided for large liquid volumes relative to the exposed cold surface so that the diminishing liquid level would produce a relatively small change in the surface area directly in contact with the cooling liquid. These designs have the obvious disadvantage of requiring relatively large, cumbersome liquid bath containers within the vacuum chamber for a given desired condensation surface area. In addition they provide poor cooling efficiency because the volume of coolant liquid is large relative to the useful condensation surface pumping area.

It is therefore the object of the present invention to provide a versatile cryostat apparatus which is continuous in its operation and which greatly reduces the necessary consumption of liquid coolant.

One feature of this invention is the provision of a cryostat device wherein cooling is provided by utilizing continuous evaporation of liquid gas in a cold wall chamber maintained at a given low pressure, the liquid gas being continuously transferred from a heat insulated container vessel.

Another feature of this device is the provision of a cryostat device of the above featured type including apparatus for continuously regulating the evacuation rate of the cold wall chamber so as to maintain the given low pressure.

Another feature of this invention is the provision of a cryostat device of the above featured type including apparatus for controlling the flow of coolant into the cold wall chamber in dependence upon the temperature of the chamber.

Another feature of this invention is the provision of a cryostat device of the above featured types wherein the fluid control apparatus is adapted to provide fluid flow into the cold wall chamber in dosed quantities so that the fluid evaporates in small droplets without the formation of a liquid bath.

Another feature of this invention is the provision of a cryostat device of the above featured types which includes apparatus adapted to produce a constriction in the coolant supply line to the cold wall chamber thereby providing a pressure drop through which the coolant liquid must pass.

Another feature of this invention is the provision of a cryostat device of the above featured type wherein the constriction is an adjustable valve.

Another feature of this invention is the provision of a cryostat device of the above featured type including apparatus for regulating the valve constriction in dependence upon the temperature of the cold wall chamber.

Another feature of this invention is the provision of a cryostat device of the above featured types wherein the adjustable valve includes a by-pass opening the size of which can be pre-set to provide a continuous flow and a controlled opening which operates in dependence upon the temperature of the cold wall chamber.

These and other features and objects of the present invention will become more apparent upon a perusal of the following specification taken in conjunction with the drawing which is a schematic showing of a preferred embodiment of the invention.

Referring now to the figure there is shown a hollow cold wall chamber 1 located in a vacuum-tight housing 1a composed of base plate 2 sealed to a pot-shaped upper part 3 by sealing gasket 3a. The housing 1a is evacuated through valve 4 set into the base plate 2.

Inserted into the base plate 2 are the vacuum jacket tubes 5, 6 and 7 opening towards the top, which encase respectively the connections for the temperature gauge 8, positioned within cold wall chamber 1, the coolant feeder tube 9 communicating with the cold wall chamber 1, and exhaust-gas tube 10. The vacuum jackets 5, 6 and 7 are evacuated simultaneously with the inside of housing 1a via the valve 4.

Feeder tube 9 and vacuum jacket 6 lead into a siphon tube 11 including a vacuum jacket 12 which is attached, gas-tight, in the neck of liquid gas storage vessel 14 by means of flange connection 13. An annular bellows arrangement 13a has an end connected to the siphon tube 11, and another end sealed to vacuum jacket 6 by O-ring screw connection 15.

The siphon tube 11 has an upper portion which accommodates the feeder tube 9 and a lower portion of smaller cross section which extends into the liquid coolant 14a contained in the storage vessel 14. Positioned within the space between siphon tube 11 and vacuum jacket 12 is an elongated cylindrical valve assembly 16 closed at its lower end by a disc valve 16a positioned between the end of feeder tube 9 and the opening into the smaller lower portion of siphon tube 11. The upper portion of the cylindrical valve assembly 16 is supported by the valve actuating rods 16b which extend through and are sealed to movable bellows 13a. The disc valve 16a is provided with apertures which are closed by the lower end of vacuum jacketed feeder tube 9 upon movement into contact therewith.

Attached to the top and communicating with the cold wall chamber 1 is an exhaust-gas tube 10, enclosing the chamber in a descending coil and the exhaust tube 10 is soldered onto a base plate 19 and a rimmed top-plate 20 which straddles the cold wall chamber 1. Coiled tube 10, cooled by the cold gas coming from cold wall chamber 1 and plates 19 and 20, in direct heat contact with coil 10, form a closed radiation protection around the cold wall chamber 1. The base plate 19 allows passage without direct contact of thermometer tube 8 and feeder tube 9 to the cold wall chamber. The cold wall chamber 1 is supported from the base plate 19 by the poorly heat-conducting pins 21. The base plate 19 is supported by poor heat conducting pins 22 which are attached to base plate 2 of housing 1a.

The temperature gauge 8a (gas pressure gauge or carbon resistor), is connected to and controls the output of a signal generator 20a which provides electrical impulse energization for the cylindrical magnet winding 23 positioned around the bellows 13a. Located within and concentric with the winding 23 is a soft iron armature 16c which is attached to the valve supporting rods 16b.

Connected to exhaust-gas tube 10 outside the housing 1a is a pressure gauge 24 showing the pressure prevailing inside of the cold wall chamber 1. Exhaust-gas tube 10 is connected with the evacuation vacuum pump 26 via flange connections 25 and 25a. Between the flanges 25 and 25a is a bellows pressure regulator 28 adapted to seal the pump outlet pipe 27 in an expanded position and to allow gas flow therethrough in a controlled position.

The open end of bellows regulator 28 is connected by tubing 28a to a pressure gauge 30 and to the vacuum pump inlet tube 27 through a valve 29. The exhaust tubulation 31 of the vacuum pump 26 is adapted for exhaust to atmosphere or for connection to a gas recovery apparatus.

In operation of the device a pressure is selected which will establish a desired equilibrium temperature within the cold wall chamber 1. With the valve open and the vacuum pump 26 operating this pressure is established within the tubing 28a as indicated by the pressure gauge 30. The valve 29 is then closed to maintain this pressure within the tubing 28a. The bellows regulator 28 will then maintain this pressure in exhaust tube 10 and connected cold wall chamber 1. The bellows accomplishes regulation by expanding to seal off the vacuum pump 26 when the established pressure in tubing 28a is greater than that within exhaust tube 10 and by contracting to open tube 27 when the pressure in tube 10 rises above the established pressure in tubing 28a.

The magnet adjustment 17 is then used to position the winding 23 in such a way that with armature 23a de-energized the disc valve 16a will be supported slightly below the closed position. The by-pass opening 16d into feeder tube 9 thus established provides for a continuous flow of coolant into the cold wall chamber 1. The size of this by-pass opening is selected to pass a quantity of coolant not quite sufficient to establish the desired temperature within the cold chamber 1. The temperature gauge 8 and signal generator device 20a are then used to control the magnet coil 23. With a higher than desired temperature within the cold chamber 1 the temperature gauge 8 causes the signal generator to supply an energizing current to magnet coil 23. The magnet energization produces a downward movement of the soft iron armature 23a which in turn lowers disc valve 16a via support rods 16b and movable bellows 13a. This downward movement of disc valve 16a enlarges the opening into feeder tube 9 allowing the passage of more coolant to thereby reduce the temperature within cold chamber 1. When the temperature therein reaches the desired value the temperature gauge 8 acts to cut off signals to the magnet winding 23 thereby returning the disc valve 16a to its originally set position. Thus the valve 16 can be set by adjustment 17 to provide a continuously open by-pass of given size and energized by magnet coil 23 to provide an additional control opening.

To maintain a desired temperature below the boiling point of the cooling medium the selected pressure and disc valve openings are such that the disc valve provides a pressure drop constriction in the coolant supply line. This in turn causes the coolant liquid to evaporate in super cooled droplet form in the feeder tube 9 and cool wall chamber 1. The cooled walls of chamber 1 can be either used to cool test samples or as a pump for the housing 1a by condensing gas molecules on its exterior surface. In the latter case a suitable dimensioning of the cool wall chamber 1 and surrounding exhaust tube 10 can produce a good combination. For example, with liquid helium used as the coolant, the cool wall chamber can be maintained at a low temperature for the pumping of hydrogen while the surrounding exhaust tube 10 at higher temperature can pump nitrogen and other gases.

Thus the installation in accordance with this invention operates on the basis of the evaporator principle, whereby the evaporating vessel is hollow and presents such a flow resistance that the freezing mixture carried to its inside in dosed quantities via the automatic control valves does not form a bath, but rather evaporates in tiny droplets. As a result of this design, the dimensions of the cooled wall may vary considerably and so may the shape of the device as well as its installation features, open to a wide variety of choice and suitable to many specialized requirements. The installation is operated continuously, insuring safe operation, even over prolonged periods of time. Also, the temperature is automatically held constant. The apparatus operates with the best possible efficiency factor of the freezing mixture, allowing the cooling of considerably larger surfaces with the same coolant quantity, as opposed to the designs known heretofore.

Obviously many modifications and variations of the present invention are possible in light of the above teachings. It is therefore to be understood that within the scope of the appended claims the invention may be practiced otherwise than as specifically described.

What is claimed is:

1. Cryogenic apparatus comprising a cold wall chamber adapted to provide a cold surface, said cold wall chamber adapted for evacuation to below atmospheric pressure, a supply vessel for a refrigeration medium, evacuation means for evacuating said cold wall chamber, feeder line means for supplying a coolant substance between said supply vessel and said cold wall chamber, coolant supply control means for changing the amount of coolant flow through said feeder line, said supply control means comprising a valve assembly positioned in said feeder line means so as to allow variation in the conductance therethrough, sealing means for gas tightly enclosing said valve assembly so as to prevent access thereto of atmospheric air temperature responsive means adapted to provide an indication of the temperature of said cold wall chamber, and regulator means responsive to the indications of said temperature responsive means adapted to automatically regulate the conductance of said valve so as to produce a coolant flow which is dependent upon the temperature of said cold wall chamber.

2. Cryogenic apparatus according to claim 1 wherein said valve assembly includes a by-pass opening and a control opening, said by-pass opening being of selected size and adapted to provide a continuous flow therethrough, and said control opening being of automatically varying size in dependence upon the indications of said temperature responsive means.

3. The apparatus according to claim 1 including automatic means connected with evacuation means for maintaining a given selected pressure in said cold wall chamber.

4. The apparatus according to claim 1 wherein said valve assembly provides a constriction in said feeder line adapted to cause droplet evaporation of the coolant substance into said cold wall chamber thereby cooling said cold wall chamber with the heat of evaporation of the produced droplets.

5. The apparatus according to claim 3 wherein said automatic means for maintaining a given pressure comprises a pressure differential valve which operates in response to the difference between two pressures, and wherein said pressure differential valve is adapted to operate in response to the difference between the pressure in said cold wall chamber and the preselected constant pressure in a vacuum sealed independent chamber.

6. The apparatus according to claim 5 wherein said regulator means includes magnetic means positioned outside said sealing means for producing a magnetic signal, and including valve actuating means positioned inside said sealing means and responsive to said magnetic means to produce movement of said valve assembly.

7. The apparatus according to claim 6 wherein said sealing means includes a movable bellows portion, said magnetic means comprises a magnetic field responsive armature, and said valve actuating means comprises a mechanical linkage passing through and gas tightly sealed to said movable bellows portion and attached to both said magnetic field responsive armature and said valve assembly.

8. The apparatus according to claim 1 wherein said regulator means includes magnetic means positioned outside said sealing means for producing a magnetic signal, and including valve actuating means positioned inside said sealing means and responsive to said magnetic means to produce movement of said valve assembly.

9. The apparatus according to claim 8 wherein said sealing means includes a movable bellows portion, said magnetic means comprises a magnetic field responsive armature, and said valve actuating means comprises a mechanical linkage passing through and gas tightly sealed to said movable bellows portion and attached to both said magnetic field responsive armature and said valve assembly.

10. The apparatus according to claim 9 wherein said cold wall chamber is mounted from one side of a base plate flange, said one side of said base plate flange having an annular sealing surface adapted to be sealed against a mating sealing flange surface, and said feeder line means extends through said base plate flange into said cold wall chamber.

11. The apparatus according to claim 10 wherein the area enclosed by said annular sealing surface is substantially greater than the cross sectional area of said cold wall chamber taken on a plane parallel to said base plate flange.

12. The apparatus according to claim 1 wherein said cold wall chamber is mounted from one side of a base plate flange, said one side of said base plate flange having an annular sealing surface adapted to be sealed aginst a mating sealing flange surface, and said feeder line means extends through said base plate flange into said cold wall chamber.

13. The apparatus according to claim 12 wherein the area enclosed by said annular sealing surface is substantially greater than the cross sectional area of said cold wall chamber taken on a plane parallel to said base plate flange.

References Cited by the Examiner

UNITED STATES PATENTS

| | | | |
|---|---|---|---|
| 1,464,319 | 8/23 | Heylandt | 62—52 |
| 1,976,688 | 10/34 | Dana et al. | 62—45 |
| 2,013,167 | 9/35 | Musto | 62—217 |
| 2,215,327 | 9/40 | Karsten | 62—217 |
| 2,754,661 | 7/56 | Coyne | 62—223 |
| 2,988,898 | 6/61 | Hesson et al. | 62—514 |
| 3,092,977 | 6/63 | Skinner | 62—514 |
| 3,097,500 | 7/63 | More | 62—514 X |

OTHER REFERENCES

"Advances in Cryogenic Engineering," vol. 5, published by Plenum Press, Inc. (New York), 1960. Article by Nicol et al. on pps. 332–337.

ROBERT A. O'LEARY, *Primary Examiner.*